United States Patent
Nakajima

(10) Patent No.: US 9,063,484 B2
(45) Date of Patent: Jun. 23, 2015

(54) FIXING DEVICE, IMAGE FORMING APPARATUS, AND BELT DRIVING UNIT

(71) Applicant: KYOCERA DOCUMENT SOLUTIONS INC., Osaka (JP)

(72) Inventor: Eiji Nakajima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 110 days.

(21) Appl. No.: 13/770,903

(22) Filed: Feb. 19, 2013

(65) Prior Publication Data

US 2013/0216283 A1     Aug. 22, 2013

(30) Foreign Application Priority Data

Feb. 21, 2012 (JP) ................. 2012-034931

(51) Int. Cl.
*G03G 15/20* (2006.01)
*B65G 15/60* (2006.01)

(52) U.S. Cl.
CPC .. *G03G 15/2053* (2013.01); *G03G 2215/00151* (2013.01); *B65G 15/60* (2013.01)

(58) Field of Classification Search
CPC ............... B65G 15/60–15/64; G03G 15/2053; G03G 2215/00151
USPC .......................... 399/162, 165, 329, 302, 308
See application file for complete search history.

(56) References Cited

FOREIGN PATENT DOCUMENTS

JP     05-297953 A     11/1993
JP     08-119484 A     5/1996

*Primary Examiner* — David Gray
*Assistant Examiner* — Sevan A Aydin
(74) *Attorney, Agent, or Firm* — Studebaker & Brackett PC

(57) ABSTRACT

A fixing device includes a first roller rotatable about a first axis of rotation, a second roller rotatable about a second axis of rotation, a fixing belt rotatably wound between the first roller and the second roller, and auxiliary rings. At least one of the rollers of the first roller and the second roller includes a rotation maintaining part configured to hold the fixing belt rotatably and a restricting flange protruding from an outer peripheral surface of each of opposite end parts in a direction of an axis of rotation of the rotation maintaining part. The auxiliary rings are located outside the opposite end parts in the direction of the axis of rotation of the rotation maintaining part, have an outer diameter larger than the restricting flange, and are rotatable independently of the restricting flange.

14 Claims, 5 Drawing Sheets

FIXING DEVICE, IMAGE FORMING APPARATUS, AND BELT DRIVING UNIT

INCORPORATION BY REFERENCE

The present application claims priority under 35 U.S.C. §119 to Japanese Patent Application No. 2012-034931, filed Feb. 21, 2012. The contents of this application are incorporated herein by reference in their entirety.

BACKGROUND

The present disclosure relates to fixing devices, image forming apparatuses and belt driving unit, which are used for copiers, printers, facsimile machines, multifunctional peripherals thereof, etc., and particularly relates to a fixing device, an image forming apparatus, and a belt driving unit, which restrict belt meandering.

Image forming apparatuses transfer a toner image formed on an image carrier, such as a photosensitive drum, or the like to a recording medium, convey the recording medium that carries the toner image to a fixing device, and apply heat and pressure to the recording medium in the fixing device, thereby fixing the toner image on the recording medium to the recording medium.

The fixing device may be of belt fixing type in which the toner image on the recording medium is fused using a fixing belt. The fixing device of the belt fixing type includes a fixing belt rotatably wound between a fixing roller and a heating roller and a pressure roller in press contact with the fixing belt so that the toner image is fused to the recording medium during the time when the recording medium passes through a nip part between the fixing belt and the pressure roller.

In the fixing device of the belt fixing type, the fixing belt may move to meander on the rollers in the axial directions of the rollers when the wound fixing belt rotates between the rollers. Such meandering of the fixing belt may accompany fixing failure, such as displacement of the toner image on the recording medium and the like. Further, incessant meandering of the fixing belt may break the edges of the belt.

Under the circumstances, techniques for suppressing meandering of the fixing belt are examined. For example, some fixing device includes a fixing belt wound between a drive roller and a meandering correction roller and a heating roller so that the recording medium is pressed and heated between the fixing belt and the heating roller to fuse the toner image. This fixing device includes a meandering detection sensor in contact with an edge of the fixing belt to detect belt meandering, the meandering correction roller, a meandering correction cam rotated by driving a motor to sway the meandering correction roller, and a clutch that rotates the motor according to a detection result by the meandering detection sensor. When the meandering detection sensor detects meandering of the fixing belt, the clutch is turned on to transmit the rotational force of the motor to the meandering correction cam. This allows the meandering correction cam to start rotating to sway the meandering correction roller in a direction in which meandering of the fixing belt is corrected.

Referring to another fixing device, a fixing belt is rotatably wound between two rollers and a C-shaped meandering preventing member having springiness is fitted in the opposite edges of one of the rollers by utilizing its spring force. The meandering preventing member has a predetermined thickness and is arranged at the opposite sides of one of the rollers with a distance spaced which is slightly larger than the width of the fixing belt. This may retain the edges of the fixing belt to prevent the fixing belt from meandering in the axial direction of the roller.

SUMMARY

A fixing device according to the present disclosure includes: a first roller rotatable about a first axis of rotation; a second roller rotatable about a second axis of rotation; a fixing belt rotatably wound between the first roller and the second roller; and auxiliary rings. At least one of the rollers of the first roller and the second roller includes a rotation maintaining part configured to hold the fixing belt rotatably and a restricting flange protruding from an outer peripheral surface of each of opposite end parts in a direction of an axis of rotation of the rotation maintaining part. The auxiliary rings are located outside the opposite end parts in the direction of the axis of rotation of the rotation maintaining part, have an outer diameter larger than the restricting flange, and is rotatable independently of the restricting flange.

An image forming apparatus according to the present disclosure includes the above the fixing device.

A belt driving unit according to the present disclosure includes: a first roller rotatable about a first axis of rotation; a second roller rotatable about a second axis of rotation; a belt rotatably wound between the first roller and the second roller; and auxiliary rings. At least one of the rollers of the first roller and the second roller includes a rotation maintaining part configured to hold the belt rotatably and a restricting flange protruding from an outer peripheral surface of each of opposite end parts in a direction of an axis of rotation of the rotation maintaining part. The auxiliary rings are located outside the opposite end parts in the direction of the axis of rotation of the rotation maintaining part, have an outer diameter larger than the restricting flange, and are rotatable independently of the restricting flange.

DETAILED DESCRIPTION

Embodiments of the present disclosure will be described below with reference to the accompanying drawing. The present disclosure is not limited to the embodiments. Further, the use, terms, and the like are not limited to those used herein.

Figure 1:
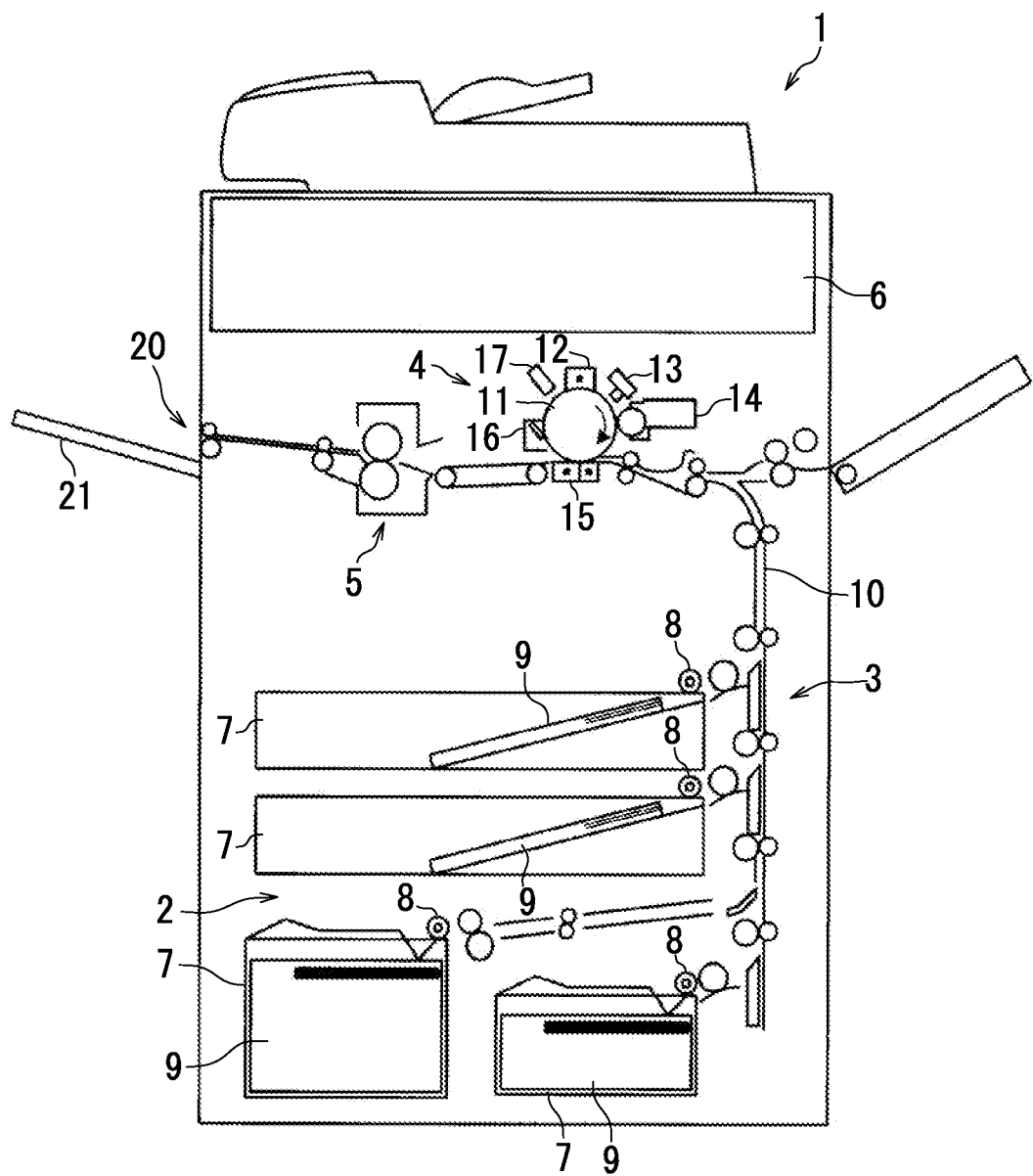
FIG. 1 is a schematic diagram showing an overall configuration of an image forming apparatus including a fixing device according to one embodiment of the present disclosure.

FIG. 1 is a diagram showing a schematic configuration of an image forming apparatus including a fixing device according to one embodiment of the present disclosure. The image forming apparatus 1 includes a paper feeder section 2 located in the lower part thereof, a paper conveyance section 3 arranged beside the paper feeder section 2, an image formation section 4 arranged above the paper conveyance section 3, a fixing device 5 arranged on an exit side of the image formation section 4, and an image reading section 6 arranged above the image formation section 4 and the fixing device 5.

The paper feeder section 2 includes a plurality of paper feed cassettes 7 that accommodate paper 9 as recording media. Rotation of a paper feed roller 8 sends the paper 9 sheet by sheet from a paper feed cassette 7 selected from the plurality of paper feed cassettes 7 to the paper conveyance section 3.

The paper 9 sent to the paper conveyance section 3 is conveyed toward the image formation section 4 through a paper conveyance path 10 provided in the paper conveyance section 3. The image formation section 4 is configured to form a toner image on the paper 9 by an electrophotographic process and includes a photoreceptor 11 supported rotatably in the direction indicated by the arrow in FIG. 1, an electrification section 12, an exposure section 13, a developing section 14, a transfer section 15, a cleaning section 16, and a charge neutralizing section 17, which are arranged around the photoreceptor 11 along the direction of the rotation of the photoreceptor 11.

The electrification section 12 includes a charging wire to which high voltage is applied. When a predetermined potential is applied by corona charging from the charging wire to the surface of the photoreceptor 11, the surface of the photoreceptor 11 is uniformly electrified. Then, when the exposure section 13 irradiates to the photoreceptor 11 light based on the image data of an original document read by the image reading section 6, the surface potential of the photoreceptor 11 is selectively dampened to form an electrostatic latent image on the surface of the photoreceptor 11.

Next, the developing section 14 develops the electrostatic latent image on the surface of the photoreceptor 11 to form a toner image on the surface of the photoreceptor 11. The transfer section 15 transfers this toner image to the paper 9 supplied between the photoreceptor 11 and the transfer section 15.

The paper 9 to which the toner image is transferred is conveyed toward the fixing device 5 arranged on the downstream side in the paper conveyance direction of the image formation section 4. In the fixing device 5, the paper 9 is heated and pressurized, thereby melting and fixing the toner image to the paper 9. Subsequently, an ejection roller pair 20 ejects the paper 9, to which the toner image is fused, onto an ejection tray 21.

After the transfer section 15 transfers the toner image to the paper 9, the cleaning section 16 removes toner remaining on the surface of the photoreceptor 11, and the charge neutralizing section 17 removes residual charge on the surface of the photoreceptor 11. Then, the electrification section 12 electrifies the photoreceptor 11 again. Thus, image formation is performed again in this manner.

Figure 2:
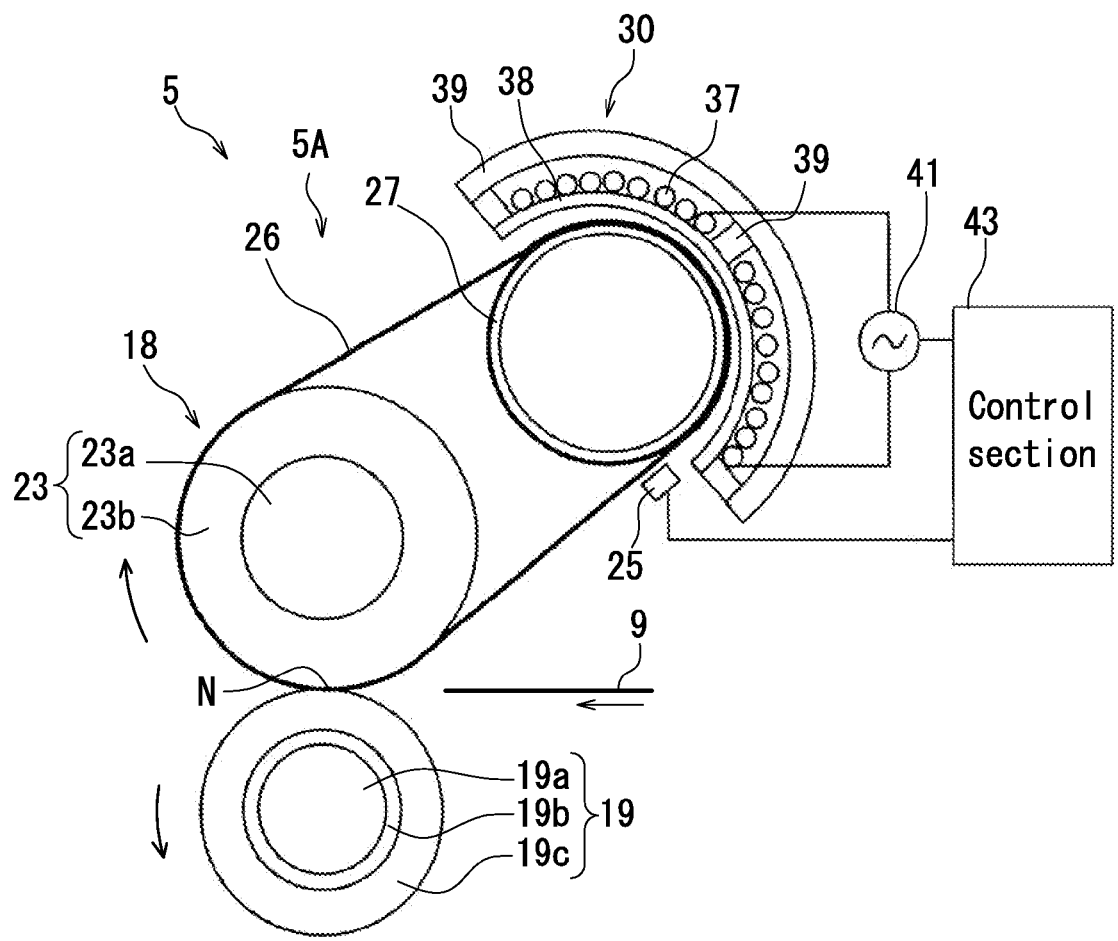
FIG. 2 is a side cross sectional view schematically showing a configuration of the fixing device according to one embodiment.

The fixing device 5 has a configuration as shown in FIG. 2. FIG. 2 is a side cross sectional view schematically showing the fixing device 5.

Here, the fixing device 5 performs fixing using a heat source of electromagnetic induction heating type. The fixing device 5 includes a heating unit 18 and a pressure roller 19. The heating unit 18 includes a fixing belt 26, a first roller 23 rotatable about a first axis of rotation, and a second roller 27 rotatable about a second axis of rotation. The fixing belt 26, which is endless, is rotatably wound between the first roller 23 and the second roller 27. The fixing device 5 further includes an induction heating section 30 arranged opposite to the second roller 27 around the outer periphery of the fixing belt 26, a power source 41 connected to the induction heating section 30, a thermistor 25 that detects the temperature of the outer peripheral surface of the fixing belt 26, and a control section 43 that controls electric current supplied from the power source 41 on the basis of the temperature detected by the thermistor 25. The pressure roller 19, the first roller 23, and the second roller 27 are supported rotatably about respective axes of rotation extending in the longitudinal direction of a box (not shown) of the fixing device 5. The induction heating section 30 and the thermistor 25 are fixed and held at the box (not shown).

The pressure roller 19 is arranged opposite to the first roller 23. When the pressure roller 19 is driven and rotated in the direction indicated by an arrow in FIG. 2 by a power supply, such as a motor or the like (not shown) to apply pressure to the first roller 23 in the direction toward the center of the first roller 23. Accordingly, the pressure roller 19 is in press contact with the first roller 23 through the fixing belt 26 to drive and rotate the fixing belt 26 and the first roller 23 in the direction indicated by an arrow in FIG. 2, thereby forming a nip part N at a part where the fixing belt 26 and the pressure roller 19, which are rotated in the relatively reverse directions, come into contact with each other. At the nip part N, the paper 9 is sandwiched. When the sandwiched paper 9 is heated and pressurized, the toner in powder form on the paper 9 is melted and fused. In this fixing device 5, the first roller 23 and the second roller 27 may be called a fixing roller and a heating roller, respectively. It is noted that in the present specification, a device including the belt 26 and the first roller 23 and the second roller 27 which rotate the belt 26 may be referred to especially as a belt driving unit 5A.

Further, the pressure roller 19 includes a cylindrical cored bar 19a, an elastic layer 19b formed on the cored bar 19a, and a mold release layer 19c that covers the surface of the elastic layer 19b. For example, the pressure roller 19 has an outer diameter of 30 mm and includes the elastic layer 19b with a thickens of 2 mm made of silicone rubber on the cored bar 19a made of aluminum and the mold release layer 19c with a thickness of 30 μm formed of a fluororesin tube or the like on the elastic layer 19b.

In order for the fixing roller (the first roller) 23 to be rotatable integrally with the fixing belt 26, the fixing roller 23 is mounted so as to be in contact with the inner peripheral surface of the fixing belt 26. For example, the fixing roller 23 has an outer diameter of 40 mm and includes the elastic layer 23b with a thickness of 8 mm made of silicone rubber on the cored bar 23a, and the fixing belt 26 is wound on the elastic layer 23b.

In order for the heating roller (the second roller) 27 to be rotatable integrally with the fixing belt 26, the heating roller 27 is mounted so as to be in contact with the inner peripheral surface of the fixing belt 26. For example, the heating roller 27 has an outer diameter of 30 mm, and includes a cored bar formed of a carbon steel pipe on which Teflon (trademark) is coated.

The fixing belt 26 is an endless heat resistant belt and is composed of, for example, an induction heated layer with a thickness of 30 μm made of electroformed nickel, an elastic layer with a thickness of 300 μm made of silicone rubber or the like, and a mold release layer with a thickness of 30 μm formed of a fluororesin tube, which are layered in this order from the inner peripheral side. The mold release layer can improve mold releasability in melting and fixing a non-fused toner image at the nip part N.

The induction heating section 30 includes an exciting coil 37, a bobbin 38, and a magnetic core 39 and causes the fixing belt 26 to generate heat by electromagnetic induction. The induction heating section 30 extends in the longitudinal direction (direction perpendicular to the surface of the paper of FIG. 2) and is arranged opposite to the fixing belt 26 so as to surround substantially a half of the outer periphery of the fixing belt 26.

The exciting coil 37 is mounted on the bobbin 38 in such a manner that a Litz wire is wound several times in a loop-like manner along the widthwise direction of the fixing belt 26 (direction perpendicular to the surface of the paper of FIG. 2). Further, the exciting coil 37 is connected to the power source 41 to generate an alternating flux by high-frequency current supplied form the power source 41. The magnetic field from the exciting coil 37 passes through the magnetic core 39, is introduced in the direction parallel to the surface of the paper of FIG. 2, and travels along and passes through the induction heated layer of the fixing belt 26. Alternating change in strength of the magnetic flux passing through the induction heated layer generates eddy current in the induction heated layer. When the eddy current flows in the induction heated layer, Joule heat is generated by the electric resistance of the induction heated layer to generate heat in the fixing belt 26.

When the fixing belt 26 is heated by the induction heating section 30 as a heat source to increase in temperature to a predetermined temperature, the paper 9 sandwiched at the nip part N is heated. This heat and pressure by the pressure roller 19 melts and fuses the toner in powder form on the paper 9 to the paper 9. Thus, since the fixing belt 26 is made of a material that is thin and has favorable thermal conductivity to have less heat capacity, warm-up can be achieved within a short period of time to enable quick start of image formation.

Figure 3:
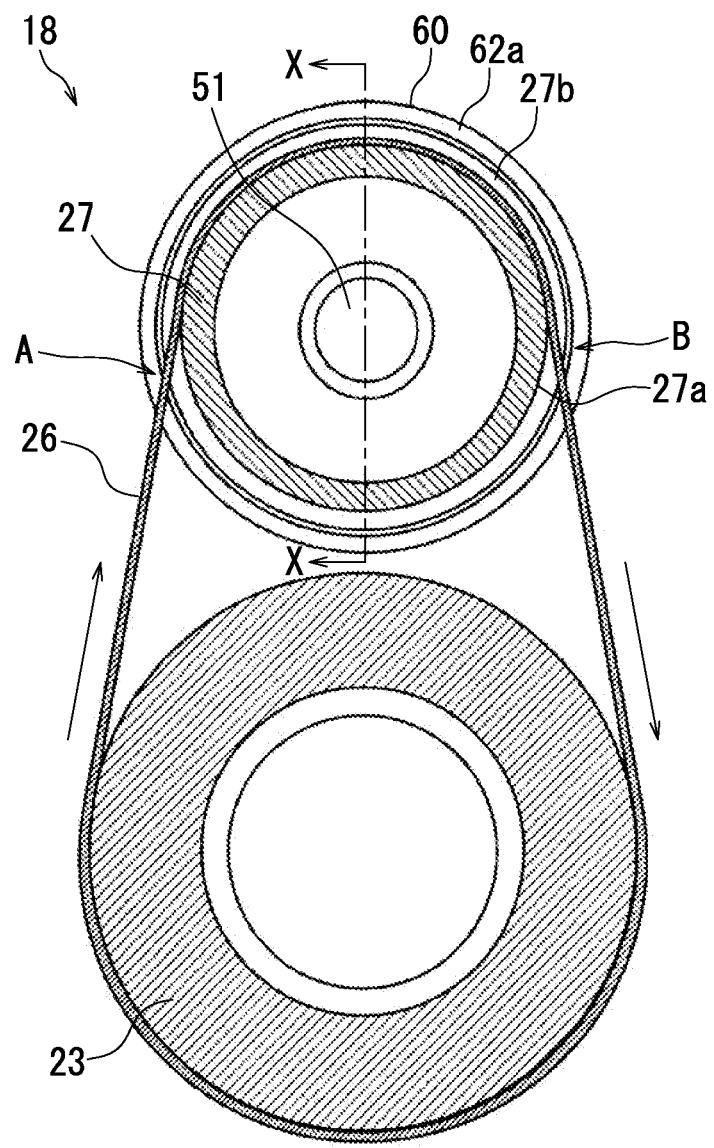
FIG. 3 is a cross sectional view showing a fixing unit of the fixing device according to one embodiment.
Figure 4:
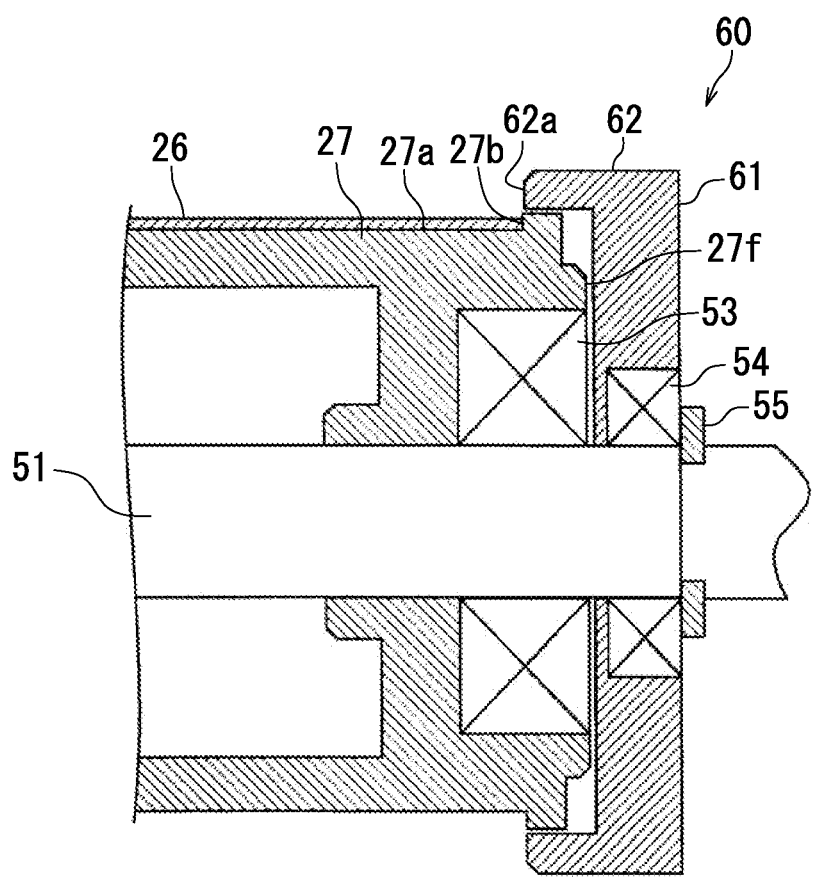
FIG. 4 is a cross sectional view taken along the line X-X in FIG. 3.

As shown in FIGS. 3 and 4, the heating roller 27 includes a meandering restricting part configured to restrict meandering of the fixing belt 26. FIG. 3 is a side cross sectional view of the heating unit 18. FIG. 4 is a cross sectional view taken along the line X-X of the heating roller 27 shown in FIG. 3.

As shown in FIG. 3, the heating roller 27 includes a rotation maintaining part 27a and a restricting flange 27b. Here, the rotation maintaining part 27a is formed integrally with the restricting flange 27b.

The rotation maintaining part 27a is cylindrical in shape and holds the fixing belt 26. The rotation maintaining part 27a allows the wound fixing belt 26 to be rotatable in conjunction with the fixing roller 23.

The restricting flange 27b protrudes annularly from the outer peripheral surface of the rotation maintaining part 27a at each end in a direction of the roller axis (a second axis of rotation) to let an edge 26d of the fixing belt 26 (see FIG. 5) come into contact therewith, thereby restricting meandering of the fixing belt 26 in the direction of the roller axis.

An auxiliary ring 60 is provided around the outer periphery of the restricting flange 27b. The auxiliary ring 60 is located outside each end in the direction of the roller axis of the rotation maintaining part 27a and has an outer diameter larger than the restricting flange 27b. Here, the auxiliary ring 60 is cylindrical in shape and is provided so as to be rotatable independently of the heating roller 27. The auxiliary ring 60 has a contact surface 62a as a peripheral surface perpendicular to the roller axis. The contact surface 62a is capable of coming into contact with the edge 26d of the fixing belt 26. When the fixing belt 26 rotates with the edge 26d of the fixing belt 26 (see FIG. 5) being in contact with the contact surface 62a of the auxiliary ring 60, the auxiliary ring 60 is rotated accompanied by the rotation of the fixing belt 26.

As shown in FIG. 4, the auxiliary ring 60 includes an annular main body 61 and a collar 62 protruding from the main body 61 at the outer peripheral end part of the main body 61. The collar 62 protrudes in parallel to the direction of the axis of rotation toward the rotation maintaining part 27a. The collar 62 is formed integrally with the main body 61. Here, the contact surface 62a is formed at the end of the collar 62. Further, a bearing 54 is provided inside the auxiliary ring 60. In addition, the heating roller 27 includes the rotation maintaining part 27a and the restricting flange 27b. A bearing 53 is additionally provided inside the heating roller 27.

The heating roller 27 is rotatably held at a predetermined position in the axial direction of a support shaft 51 through the bearing 53. Further, the auxiliary ring 60 is positioned at the predetermined position in the axial direction by an end surface 27f in the axial direction of the heating roller 27 and a washer 55 fitted to the support shaft 51 and is rotatably held through the bearing 54. The support shaft 51 is fixed and held in the longitudinal direction of the box (not shown) of the fixing device 5. Accordingly, the auxiliary ring 60 is rotatable independently of the heating roller 27 through the support shaft 51.

Figure 5:
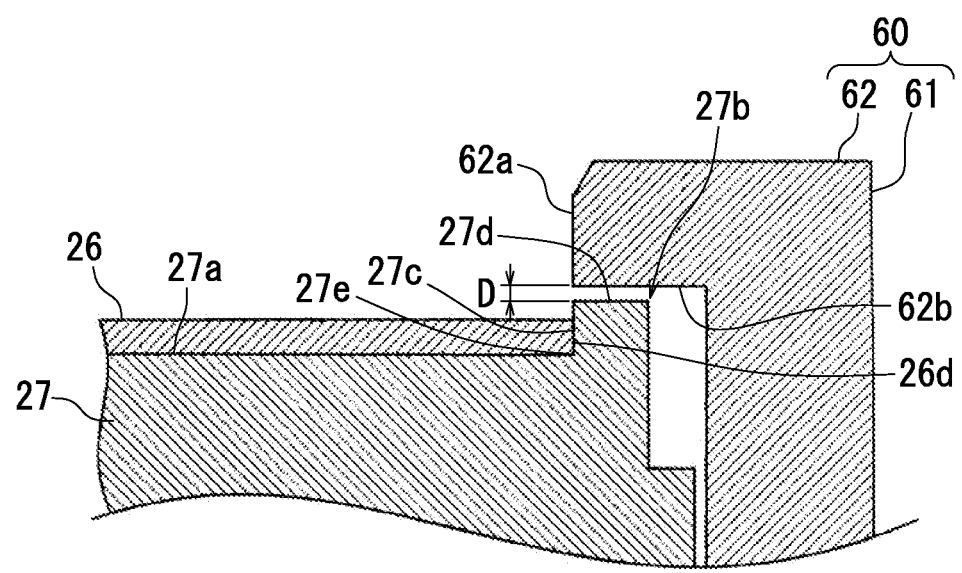
FIG. 5 is a partially enlarged view of FIG. 4.

FIG. 5 shows each configuration of the restricting flange 27b and the auxiliary ring 60 in detail. FIG. 5 is a cross sectional view, in enlarged scale, showing the meandering restricting part in FIG. 4.

The restricting flange 27b has an inner side surface 27c with which the edge 26d of the fixing belt 26 comes into contact. The contact surface 62a of the auxiliary ring 60 is arranged at substantially the same position in the direction of the roller axis as the inner side surface 27c. Further, as described above, the restricting flange 27b protrudes from the rotation maintaining part 27a. The heating roller 27 includes an outer peripheral portion 27d defined by the outer surface of the restricting flange 27b and an inner peripheral portion 27e defined by the outer surface of the rotation maintaining part 27a. The inner side surface 27c connects the outer peripheral portion 27d with the inner peripheral portion 27e.

Mounting the auxiliary ring 60 at the above predetermined position against the heating roller 27 results in that the contact surface 62a of the auxiliary ring 60 is located at substantially the same position in the direction of the roller axis as the surface (the inner side surface) 27c of the restricting flange 27b with which the edge 26 of the fixing belt 26 comes into contact. That is, the contact surface 62a of the auxiliary ring 60 and the inner side surface 27c of the restricting flange 27b are arranged so as to be aligned with each other in the direction of the roller axis.

With this configuration, when the fixing belt 26 moves on the heating roller 27 in the direction of the roller axis to meander in rotation of the fixing belt 26 between the heating roller 27 and the fixing roller 23 (see FIG. 3), the edge 26d of the fixing belt 26 can come into contact with the inner side surface 27c of the restricting flange 27b, thereby restricting meandering of the fixing belt 26.

Moreover, when the edge 26d of the fixing belt 26 comes into contact with the inner side surface 27c of the restricting flange 27b that restricts meandering of the fixing belt 26, it also comes into contact with the contact surface 62a of the auxiliary ring 60. Rotation of the fixing belt 26, of which the edge 26d is being in contact with the contact surface 62a of the auxiliary ring 60, accompanies driving and rotation of the auxiliary ring 60. At a part where the fixing belt 26 enters the heating roller 27 by rotation of the fixing belt 26 (a part A in FIG. 3), difference in linear velocity between the outer peripheral portion 27d and the inner peripheral portion 27e of the restricting flange 27b is caused by rotation of the heating roller 27. However, the rotation of the fixing belt 26 accompanies driving and rotation of the auxiliary ring 60 to reduce influence from the difference, so that a part of the fixing belt 26 near the auxiliary ring 60 can stably enter the heating roller 27. Further, at a part where the fixing belt 26 separates from the heating roller 27 by rotation of the fixing belt 26 (part B in FIG. 3), difference in linear velocity between the outer peripheral portion 27d and the inner peripheral portion 27e of the restricting flange 27 is caused by rotation of the heating roller 27. However, the rotation of the fixing belt 26 accompanies driving and rotation of the auxiliary ring 60 to reduce influence from the difference, so that the part the fixing belt 26 near the auxiliary ring 60 can stably separate from the heating roller 27. Accordingly, when the edge 26d of the fixing belt 26 comes into contact with the restricting flange 27b, meandering of the fixing belt 26 can be restricted to suppress pull-up force and pressing force to the fixing belt 26 caused due to the difference in linear velocity in the restricting flange 27b. Thus, damage of cracking, breakage, etc. of the fixing belt 26 can be reduced which is caused due to repetition of application of the pull-up force and the pressing force accompanied by rotation of the fixing belt 26.

The inner surface 62b inside the contact surface 62a of the auxiliary ring 60 is located so as to keep a space D in the radial direction of the axis of rotation away from the outer peripheral portion 27d of the restricting flange 27. The space D is smaller than the thickness of the fixing belt 26. With the space D smaller than the thickness of the fixing belt 26, even when the rotating fixing belt 26 is wound to the rotation maintaining part 27a of the heating roller 27, or even when it is separated from the rotation maintaining part 27a of the heating roller 27, the edge 26d of the fixing belt 26 is prevented from being caught by the space D. The space D does not act as a hitch in rotation of the fixing belt 26.

It is noted that although the auxiliary ring 60 in the above embodiment includes, but not limited to, the collar 62. For example, where the restricting flange 27b is comparatively thin, the auxiliary ring 60 may not include the collar 62. Further, the roller 27 is provided with the auxiliary ring 60 in the above embodiment. However, the present disclosure is not limited thereto and may provide the auxiliary ring 60 to the roller 23. Alternatively, the auxiliary ring 60 may be provided to each of the roller 27 and the roller 23.

Furthermore, the above embodiment presents an example including, but not limited to, the fixing device 5 of the electromagnetic induction heating type. In the present disclosure, the auxiliary ring 60 may be provided at a heating roller in a fixing device in which a fixing belt is rotatably wound between a fixing roller being in press contact with the pressure roller and the heating roller heated by a heater of a halogen lamp or the like as a heat source. Alternatively, the auxiliary ring 60 may be provided at the fixing roller. Further, the heat source is arranged in the vicinity of the roller 27 in the above embodiment, but the present invention is not limited thereto. Any suitable heating means may be arranged at any position where it can heat the fixing belt 26.

Moreover, the fixing device 5 in the above embodiment includes, but limited to, the heating unit 18 and the pressure roller 19. It is possible that the fixing device 5 including the first roller 23, the second roller 27, the fixing belt 26 (each shown in FIG. 2), and the auxiliary ring 60 (see FIGS. 3-5), which has an outer diameter larger than the restricting flange 27b and is provided outside the rotation maintaining part 27a of at least one of the first roller 23 and the second roller 27, is fitted to the pressure roller 19 and the heat source 30 (see FIG. 2) which are provided separately, to perform fixing to a recording medium.

In addition, the first roller 23, the second roller 27, and the fixing belt 26 (each shown in FIG. 2) are used for a fixing device for fixing a toner image to a recording medium in the above embodiment. However, this does not limit the present disclosure. It is obvious for a person skill in the art that in the belt driving unit 5A including the first roller 23, the second roller 27, and the belt 26 (each shown in FIG. 2) for any purpose rather than fixing, when the auxiliary ring 60 (see FIGS. 3-5) with an outer diameter larger than that of the restricting flange 27b is provided outside the rotation maintaining part 27a of at least one of the first roller 23 and the second roller 27 so as to be rotatable independently of the restricting flange 27b, meandering of the belt 26 can be suppressed.

The present disclosure can be utilized in fixing devices, image information devices, and belt driving units used for copiers, printers, facsimile machines, multifunctional peripherals thereof, etc. and can be particularly utilized in a fixing device, an image forming apparatus, and a belt driving unit which restrict meandering of a belt.

What is claimed is:

1. A fixing device, comprising:
a first roller rotatable about a first axis of rotation;
a second roller rotatable about a second axis of rotation;
a fixing belt rotatably wound between the first roller and the second roller; and
auxiliary rings capable of coming into contact with the fixing belt and each configured to be rotated accompanied by rotation of the fixing belt in a state in which the fixing belt is in contact therewith,
wherein at least one of the rollers of the first roller and the second roller includes a rotation maintaining part configured to hold the fixing belt rotatably and a restricting flange protruding from an outer peripheral surface of each of opposite end parts in a direction of an axis of rotation of the rotation maintaining part,
the auxiliary rings are located outside the opposite end parts in the direction of the axis of rotation of the rotation maintaining part, have an outer diameter larger than the restricting flange, and are rotatable independently of the restricting flange,
the fixing device further comprising:
a support shaft;
first bearings provided inside the at least one of the rollers, the support shaft passing through the first bearings; and
second bearings provided inside the respective auxiliary rings, the support shaft passing through the second bearings,
the at least one of the rollers is rotatably held at the support shaft through the first bearings, and
each auxiliary ring is rotatably held at the support shaft through the corresponding second bearing.

2. The fixing device of claim 1, wherein
the auxiliary ring includes a collar protruding in parallel to a direction of the axis of rotation of the at least one of the rollers toward the rotation maintaining part.

3. The fixing device of claim 2, wherein
the collar of the auxiliary ring has an end surface substantially aligned with a boundary surface between the restricting flange and the rotation maintaining part.

4. The fixing device of claim 2, wherein
a space in a radial direction to the axis of rotation between the collar of the auxiliary ring and the restricting flange is smaller than a thickness of the fixing belt.

5. The fixing device of claim 1, wherein
the rotation maintaining part is provided integrally with the restricting flange.

6. The fixing device of claim 1, further comprising:
a pressure roller arranged opposite to the first roller; and
a heat source arranged opposite to the second roller.

7. An image forming apparatus comprising:
a fixing device including:
a first roller rotatable about a first axis of rotation;

a second roller rotatable about a second axis of rotation;
a fixing belt rotatably wound between the first roller and the second roller; and
auxiliary rings capable of coming into contact with the fixing belt and each configured to be rotated accompanied by rotation of the fixing belt in a state in which the fixing belt is in contact therewith,
wherein at least one of the rollers of the first roller and the second roller includes a rotation maintaining part configured to hold the fixing belt rotatably and a restricting flange protruding from an outer peripheral surface of each of opposite end parts in a direction of an axis of rotation of the rotation maintaining part,
the auxiliary rings are located outside the opposite end parts in the direction of the axis of rotation of the rotation maintaining part, have an outer diameter larger than the restricting flange, and are rotatable independently of the restricting flange,
the fixing device further includes:
 a support shaft;
  first bearings provided inside the at least one of the rollers, the support shaft passing through the first bearings; and
  second bearings provided inside the respective auxiliary rings, the support shaft passing through the second bearings,
the at least one of the rollers is rotatably held at the support shaft through the first bearings, and
each auxiliary ring is rotatably held at the support shaft through the corresponding second bearing.

8. A belt driving unit comprising:
a first roller rotatable about a first axis of rotation;
a second roller rotatable about a second axis of rotation;
a belt rotatably wound between the first roller and the second roller; and
auxiliary rings capable of coming into contact with the belt and each configured to be rotated accompanied by rotation of the belt in a state in which the belt is in contact therewith,
wherein at least one of the rollers of the first roller and the second roller includes a rotation maintaining part configured to hold the belt rotatably and a restricting flange protruding from an outer peripheral surface of each of opposite end parts in a direction of an axis of rotation of the rotation maintaining part,
the auxiliary rings are located outside the opposite end parts in the direction of the axis of rotation of the rotation maintaining part, have an outer diameter larger than the restricting flange, and are rotatable independently of the restricting flange,
the belt driving unit further comprising:
a support shaft;
first bearings provided inside the at least one of the rollers, the support shaft passing through the first bearings; and
second bearings provided inside the respective auxiliary rings, the support shaft passing through the second bearings,
the at least one of the rollers is rotatably held at the support shaft through the first bearings, and
each auxiliary ring is rotatably held at the support shaft through the second corresponding bearing.

9. The fixing device of claim 1, further comprising:
washers fitted to the support shaft to correspond to the auxiliary rings,
wherein the at least one of the rollers has end surfaces facing the respective auxiliary rings,
the auxiliary rings are positioned at predetermined positions in an axial direction of the support shaft by the respective end surfaces of the at least one of the rollers and the respective washers.

10. The fixing device of claim 1, wherein
the restricting flange has an inner side surface as a peripheral surface perpendicular to the support shaft, the inner side surface allowing an edge of the fixing belt to come into contact therewith, and
the auxiliary rings each have a contact surface as a peripheral surface perpendicular to the support shaft, the contact surface being capable of coming into contact with the edge of the fixing belt.

11. The fixing device of claim 10, wherein
the at least one of the rollers includes:
 outer peripheral portions defined by outer surfaces of the respective restricting flanges; and
 inner peripheral portions defined by an outer surface of the rotation maintaining part, and
the inner peripheral side surface of the restricting flange connects the outer peripheral portion with the inner peripheral portion of the at least one of the rollers.

12. The fixing device of claim 11, wherein
an inner surface inside the contact surface of each auxiliary ring is located so as to keep a space in a radial direction of the support shaft away from the outer peripheral portion of the restricting flange.

13. The fixing device of claim 10, wherein
the contact surface of the auxiliary ring and the inner side surface of the restricting flange are aligned with each other in an axial direction of the support shaft.

14. The fixing device of claim 10, wherein
each auxiliary ring rotates accompanied by rotation of the fixing belt in a state in which the edge of the fixing belt is in contact with the corresponding contact surface of the auxiliary ring.

* * * * *